United States Patent
Kawase (10) Patent No.: US 10,173,321 B2
(45) Date of Patent: Jan. 8, 2019

(54) ROBOT SYSTEM PROVIDED WITH A PLURALITY OF CONTROLLERS WHICH OPERATE A PLURALITY OF INDUSTRIAL ROBOTS

(71) Applicant: DENSO WAVE INCORPORATED, Chita-gun, Aichi-pref. (JP)

(72) Inventor: Daisuke Kawase, Konan (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 21 days.

(21) Appl. No.: 14/988,129

(22) Filed: Jan. 5, 2016

(65) Prior Publication Data
US 2016/0193730 A1   Jul. 7, 2016

(30) Foreign Application Priority Data
Jan. 6, 2015   (JP) ................ 2015-000924

(51) Int. Cl.
*F16P 3/20*   (2006.01)
*B25J 9/16*   (2006.01)

(52) U.S. Cl.
CPC ... *B25J 9/1674* (2013.01); *G05B 2219/40221* (2013.01); *Y10S 901/02* (2013.01)

(58) Field of Classification Search
CPC ...... A61B 34/30; A61B 34/37; A61B 19/2203
See application file for complete search history.

(56) References Cited

U.S. PATENT DOCUMENTS

2005/0075757 A1\*   4/2005   Haas .................. G01N 35/0092
                                                                700/245

FOREIGN PATENT DOCUMENTS

JP         2011-088241 A        5/2011

\* cited by examiner

*Primary Examiner* — Sibin Chen
(74) *Attorney, Agent, or Firm* — Oliff PLC (57) ABSTRACT

In a robot system that is configured by a master controller and a slave controller, an input path of a safety input signal and an output path of an enable signal outputted from a safety monitoring unit within the master controller are wired to enable output outside of the master controller, an operating switch and the master controller are connected by a connection cable, the master controller and the slave controller are connected by a connection cable, a control unit of the slave controller is connected to the input path of the safety input signal, and a contact for power is connected to the output path of the enable signal.

16 Claims, 3 Drawing Sheets

ROBOT SYSTEM PROVIDED WITH A PLURALITY OF CONTROLLERS WHICH OPERATE A PLURALITY OF INDUSTRIAL ROBOTS

CROSS-REFERENCE TO RELATED APPLICATION

This application is based on and claims the benefit of priority from earlier Japanese Patent Application No, 2015-000924 filed Jan. 6, 2015 the description of which are incorporated herein by reference.

BACKGROUND OF THE INVENTION

Field of the Invention

The present invention relates to a robot system and a wiring method for a robot system, and in particular, to a robot system provided with a signal line enables a robot to stop in an emergency and a wiring method for a robot system provided with a signal line that enables a robot to stop in an emergency.

Related Art

To ensure the reliability of an emergency stop operation to stop a robot in the event of an emergency, a robot controller (referred to, hereafter, as simply a controller) may be provided with a plurality of systems of a means for performing the emergency stop operation by monitoring a safety input signal, such as an emergency stop signal or an enable signal. For example, JP-A-2011-88241 describes an invention in which a safety programmable logic controller (PLC) is provided within a controller.

In the case of robots for industrial use, a plurality of robots may be operated in an interlinked manner. In this case, each individual robot is controlled by a controller. Here, the controllers preferably start the emergency stop operation by a single safety input signal, that is, by operation of a single operating switch. A reason for this is that, when the plurality of robots are operated in an interlinked manner, if the other robots are in operation while one robot is stopped, for example, the position of a workpiece that is being gripped by two robots may become upset. In addition, a robot may come into contact with a worker who approaches the robot under an assumption that the robot has stopped, or a robot may come into contact with another robot that has already stopped, peripheral equipment, and the like.

Furthermore, when the plurality of robots are operated in an interlinked manner, the safety input signal is preferably inputted to all controllers. A reason for this is as follows. In the case of a configuration in which the safety input signal is inputted to a single controller that serves as a main controller and the other controllers are controlled as sub-controllers by the main controller, should malfunction occur in the main controller or an abnormality occur in the connection between the main controller and a sub-controller, giving an instruction to perform the emergency stop operation may no longer be possible.

Some controllers are provided with a function for detecting a failure on a path over which the safety input signal is inputted. The detection is made through determination of the certainty of the safety input signal. Specifically, the controller generates the safety input signal therein and outputs the generated safety input signal. The controller then determines whether or not a safety input signal that is inputted by way of an external operating switch matches the safety input signal outputted by the controller itself, in terms of cycle and pattern. Based on the determination, the controller detects a failure, such as a ground fault or a short circuit in the wiring. In this case, because the certainty of the inputted safety input signal is guaranteed, higher reliability can be ensured.

However, when a plurality of controllers such as that described above is present, when all controllers are connected to a single operating switch, as described above, a collision occurs among the safety input signals and normal monitoring cannot be performed. In this case, even should the safety input signal outputted from one controller also be connected to the other controllers, the inputted safety input signal is not a safety input signal that has been outputted from the other controllers in the first place. Consequently, the patterns do not match, and the other controllers determine the safety input signal to be abnormal. That said, should the function for confirming the certainty of the safety input signal be omitted, reliability will decrease.

In this way, when the plurality of systems of the means for performing an emergency stop operation by monitoring a safety input signal is provided, to enable each controller to perform the emergency stop operation in a state in which the certainty of the safety input signal is guaranteed, simple wiring that merely connects between controllers cannot be used.

SUMMARY

Hence it is desired to provide a robot system and a robot wiring method in which, in a configuration that is provided with a plurality of robot controllers, each having a plurality of systems of a means for performing an emergency stop operation by monitoring a safety input signal, each controller can be made to perform the emergency stop operation through operation of a single operating switch, with simple wiring and in a state in which the certainty of the safety input signal is guaranteed.

In an exemplary embodiment, a robot system is configured by one master controller, and one slave controller or more. The master controller has a first safety monitoring unit that performs an emergency stop operation based on whether or not a safety input signal that has passed through an operating switch is inputted, and a second safety monitoring unit that performs the emergency stop operation and outputs an enable signal based on whether or not the safety input signal that has passed through the operating switch is inputted. The slave controller has the first safety monitoring unit and an emergency stopping means that operates by the enable signal. In the master controller of the robot system, an input path of the safety input signal that has passed through the operating switch and an output path of the enable signal outputted from the second safety monitoring unit are wired to enable output outside of the master controller. The operating switch and the master controller are connected by a first connection cable. The master controller and the slave controller are connected by a second connection cable. In the slave controller, the first safety monitoring unit is connected to the input path of the safety input signal and the emergency stopping means is connected to the output path of the enable signal.

As a result, the necessary connection cables are the first connection cable connecting the maser controller to the operating switch and the second connection cable connecting between the controllers. Therefore, wiring can be facilitated. In addition, the safety input signal is inputted to all controllers. Therefore, in all controllers, the respective first safety monitoring units can perform the emergency stop operation by monitoring the safety input signal.

In addition, all controllers perform the emergency stop operation based on a common safety input signal. Therefore, compared to a configuration in which each controller individually determines whether or not to perform the emergency stop based on a separate safety input signal, reliability during emergency stop can be enhanced. In addition, wiring of the operating switch is only required to be performed between the operating switch and the master controller. Therefore, wiring does not become complex.

Consequently, in a configuration in which a plurality of robot controllers, each having a plurality of systems of a means for performing an emergency stop operation by monitoring a safety input signal, are provided, each controller can be made to perform the emergency stop operation through operation of a single switch, with simple wiring.

In addition, the second safety monitoring unit provided in the master controller contributes to redundancy of safety monitoring by the master controller. In addition, the second safety monitoring unit also serves to achieve redundancy of safety monitoring on the slave controller side. As a result, collision of safety confirmation signals can be avoided and normal monitoring can be performed, while actualizing redundancy on the slave controller side as well.

It is preferred that the second safety monitoring unit generates and outputs the safety input signal. In addition, the second safety monitoring unit performs the emergency stop operation based on whether or not the outputted safety input signal is inputted by way of the operating switch, and whether or not the inputted safety input signal matches the outputted safety input signal.

As a result, because the enable signal that guarantees the certainty of the safety input signal is inputted to all slave controllers, in all slave controllers, the respective emergency stopping means operates in a state in which the certainty of the safety input signal is guaranteed. That is, although the slave controller does not directly confirm the certainty of the safety input signal, the slave controller performs the emergency stop operation based on the enable signal that indicates that the certainty of the safety input signal has been confirmed by the second safety monitoring unit. Therefore, the emergency stopping means of the slave controller can be operated in a state in which the certainty of the safety input signal is indirectly guaranteed.

Consequently, in a configuration in which a plurality of robot controllers, each having a plurality of systems of a means for performing an emergency stop operation by monitoring a safety input signal, are provided, each controller can be made to perform the emergency stop operation through operation of a single switch, with simple wiring and in a state in which the certainty of the safety input signal is guaranteed.

It is also preferred that the emergency stopping means is configured by a contact for power that blocks and connects a power path. As a result, the power path can be mechanically blocked during an emergency stop. A reliable stop operation can be performed.

It is still preferred that in the slave controller, the input path of the safety input signal that has passed through the operating switch and the output path of the enable signal outputted from the second safety monitoring unit of the master controller are wired to enable output to another slave controller side. When a plurality of slave controllers are present, the slave controllers are arranged adjacent to each other. The slave controllers are connected by the second connection cable.

Therefore, even should the number of slave controllers increase, the wiring can be prevented from becoming complex because the wiring is merely required between adjacent slave controllers.

It is preferred that within the master controller, the first safety monitoring unit and the second safety monitoring unit are connected by a first communication path to enable monitoring of the operating state of the first safety monitoring unit by the second safety monitoring unit or to enable mutual monitoring of operating states.

Therefore, when a failure occurs in the first safety monitoring unit, the second safety monitoring unit detects the failure and performs the emergency stop operation. In addition, when a failure occurs in the second safety monitoring unit, if the first safety monitoring unit is capable of monitoring, the first safety monitoring unit detects the failure and performs the emergency stop operation.

As a result of mutual monitoring of operating states such as this, reliability can be further enhanced.

It is preferred that between the master controller and the slave controller, the respective first safety monitoring units are connected by a second communication path to enable monitoring of the operating state of the first safety monitoring unit within the slave controller by the first safety monitoring unit within the master controller, or to enable mutual monitoring of operating states.

As a result, when a failure occurs in the first safety monitoring unit of the slave controller, the first safety monitoring unit of the master controller detects the failure and makes the second safety monitoring unit perform the emergency stop operation. The output of the enable signal thereby stops. The emergency stopping means of the slave controller enters a non-conductive state, and the emergency stop operation is performed.

As a result of mutual monitoring of operating states being performed in this way, reliability can be further enhanced.

DETAILED DESCRIPTION OF THE PREFERRED EMBODIMENTS

Embodiments of the present invention will hereinafter be described with reference to FIG. 1 to FIGS. 3A and 3B.

Figure 1:
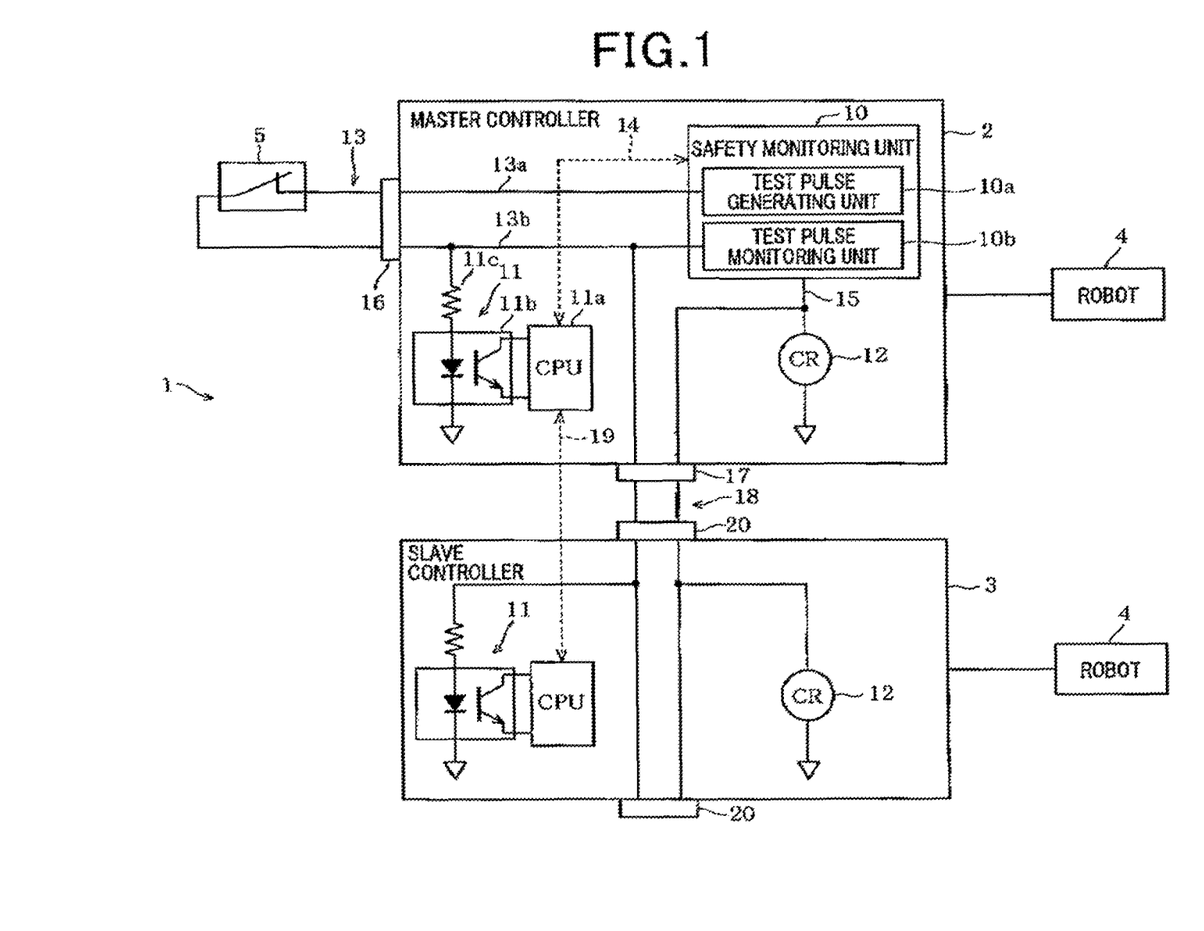
FIG. 1 is a diagram schematically showing the wiring of robot controllers according to an embodiment.

As shown in FIG. 1, a robot system 1 according to the present embodiment includes a plurality of robot controllers (referred to, hereafter, as simply controllers), robots 4 that are each controlled by a controller, a single operating switch 5, and the like. The plurality of robot controllers consists of a master controller 2 and a slave controller 3. The operating switch 5 is used to stop the robot system 1 in an emergency. The operating switch 5 is a so-called emergency stop switch, an enabling switch, or the like. The operating switch 5 is in a conductive state during normal operation and enters a non-conductive state by being operated during an emergency stop.

The master controller 2 is configured by a safety monitoring unit 10 (corresponding to a second safety monitoring unit), a control unit 11 (corresponding to a first safety monitoring unit), a contact for power 12 (corresponding to an emergency stopping means; indicated as CR (contactor relay) in FIG. 1), and the like. The contact for power 12 is driven by the safety monitoring unit 10. In addition to the foregoing, each controller is provided with typical circuits, such as a power supply circuit, for controlling the robot 4 (not shown).

The safety monitoring unit 10 includes a test pulse generating unit 10a and a test pulse monitoring unit 10b. The test pulse generating unit 10a generates and outputs test pulses (corresponding to a safety input signal). According to the present embodiment, the test pulses are generated and outputted as a pulse signal in which a high (H) level state and a low (L) level state are repeated in an alternating manner at a predetermined cycle. The safety monitoring unit 10 is configured by a microcomputer or the like (not shown). According to the present embodiment, the test pulse generating unit 10a and the test pulse monitoring unit 10b are actualized by software.

The test pulse monitoring unit 10b provides a function for monitoring the test pulses that are outputted from the test pulse generating unit 10a and are inputted to the test pulse monitoring unit 10b itself by way of the operating switch 5 that is connected by a connection cable 13 (corresponding to a first connection cable). At as this time, the test pulse monitoring unit 10b monitors whether or not the test pulses are being inputted and whether or not the inputted test pulses are correct.

For example, when a failure, such as a ground fault or a short circuit in the wiring, occurs on the path from the test pulse generating unit 10a, through the operating switch 5, to the input of the test pulse monitoring unit 10b, the test pulses are no longer inputted. Alternatively, the test pulses become distorted and the signal level changes. Therefore, the test pulse monitoring unit 10b monitors the certainty of the test pulses based on whether or not the pattern, such as the signal levels or the cycle, of the inputted test pulses matches the pattern of the test pulses outputted from the test pulse generating unit 10a. Therefore, the test pulse monitoring unit 10b also functions as a failure detecting means for detecting a failure on the path over which the test pulses flow.

When determined that the inputted test pulses match the outputted test pulses, the test pulse monitoring unit 10b outputs an enable signal to the contact for power 12. As a result of the enable signal, the contact for power 12 enters a conductive state. Meanwhile, when determined that the patterns do not match, including when the test pulses are not inputted, the test pulse monitoring unit 10b performs an emergency stop operation. In this case, the test pulse monitoring unit 10b stops the output of the enable signal as the emergency stop operation. As a result, the contact for power 12 enters a non-conductive state during the emergency stop and a power path is blocked.

The safety monitoring unit 10 that includes the test pulse generating unit 10a and the test pulse monitoring unit 10b, such as those described above, functions as a means for performing the emergency stop operation while monitoring the test pulses and also confirming the certainty of the inputted test pulses, in the master controller 2.

The control unit 11 that is provided in the master controller 2 includes a central processing unit (CPU) 11a. The control unit 11 controls the overall master controller 2. The control unit 11 determines whether or not an emergency stop has occurred based on whether or not the test pulses are inputted. More specifically, the test pulses that are outputted from the safety monitoring unit 10 and passes through the operating switch 5 are converted to a level allowing input to the CPU 11a by a relay 11b and a resistor 11c.

When the test pulses are inputted, that is, when an input signal after level conversion is inputted in the H level state (a level recognized as being a normal operating state) at a predetermined cycle at a predetermined proportion or more, the control unit 11 determines that an operation for emergency stop is not performed. The control unit 11 performs normal control. Meanwhile, when the test pulses are not inputted, the control unit 11 determines that an operation for emergency stop is performed. The control unit 11 performs the emergency stop operation.

In this way, the control unit 11 functions as a means for performing the emergency stop operation by monitoring the test pulses. However, unlike the above-described safety monitoring unit 10, the control unit 11 does not provide a function for guaranteeing the certainty of the test pulses. That is, even when an H-level signal is inputted at all times, the control unit 11 performs the normal operation.

The safety monitoring unit 10 and the control unit 11 are connected by a communication path to enable mutual monitoring of operating states. According to the present embodiment, the safety monitoring unit 10 and the control unit 11 communicate with each other at a predetermined cycle over a communication path 14 to confirm operations. When the communication is not performed at the predetermined cycle, when a response from the other unit side is not in a predetermined format, or the like, either of the safety monitoring unit 10 and the control unit 11 determines that an abnormality has occurred in the operating state on the other unit side, and performs the emergency stop operation. As described hereafter, the control unit 11 is also provided with a communication path 19 to the control unit 11 of the slave controller 3.

In this way, the master controller 2 is provided with a plurality of systems of a means for performing an emergency stop operation by monitoring test pulses (a safety input signal), namely the control unit 11 and the contact for power 12 (the safety monitoring unit 10 may also be included). In addition, the master controller 2 is also configured to be capable of guaranteeing the certainty of the test pulses by the safety monitor unit 10.

The slave controller 3 is provided with a configuration that is essentially the same as those of the control unit 11 and the contact for power 12 in the master controller 2, described above. Therefore, in the slave controller 3 as well, the control unit 11 and the contact for power 12 are described with the same reference numbers.

The slave controller 3 includes a plurality of systems of a means for performing an emergency stop operation by monitoring test pulses, namely the control unit 11 and the contact for power 12. However, the slave controller 3 does not include the safety monitoring unit 10 that is provided in the master controller 2. The slave controller 3 alone does not provide a function for guaranteeing the certainty of test pulses.

The slave controller 3 is connected to the master controller 2 by a connection cable 18 (corresponding to a second connection cable). As a result of the connection cable 18, a path over which the test pulses that have passed through the operating switch 5 flow (corresponding to an input path for the safety input signal) and a path over which the above-described enable signal flows (corresponding to an output path for the enable signal) are formed between the slave controller 3 and the master controller 2.

The slave controller 3 is placed adjacent to the master controller 2 on a control board or the like (not shown).

Therefore, the slave controller 3 and the master controller 2 are connected by the connection cable 18 by so-called transition wiring. That is, direct wiring is not provided between the slave controller 3 and the operating switch 5.

Specifically, the master controller 2 is connected to the operating switch 5 by the connection cable 13, with a connector 16 therebetween. At this time, when the path from the test pulse generating unit 10a to the operating switch 5 is a first path 13a, and the path from the operating switch 5 to the test pulse monitoring unit 10b is a second path 13b, the second path 13b corresponds to the path over which the test pulses that have passed through the operating switch 5 flow. The second path 13b is connected from a connector 17 to a connector 20 of the slave controller 3, via the connection cable 18. The second path 13b is connected to the control unit 11 within the slave controller 3. That is, the path over which the test pulses flow is shared between the slave controller 3 and the master controller 2.

In addition, when the path over which the enable signal outputted from the safety monitoring unit 10 within the master controller 2 flows is a third path 15, in a manner similar to the second path 13b, the third path 15 is connected from the connector 17 to the connector 20 of the slave controller 3, via the connection cable 18. The third path 15 is connected to the contact for power 12 within the slave controller 3. That is, the path over which the enable signal flows is shared between the slave controller 3 and the master controller 2.

In this way, the master controller 2 is wired such as to enable the input path of the safety input signal that passes through the operating switch 5 and the output path of the enable signal outputted from the safety monitoring unit 10 (second safety monitoring unit) to be outputted outside (in this case, to the slave controller 3).

Figure 3A:
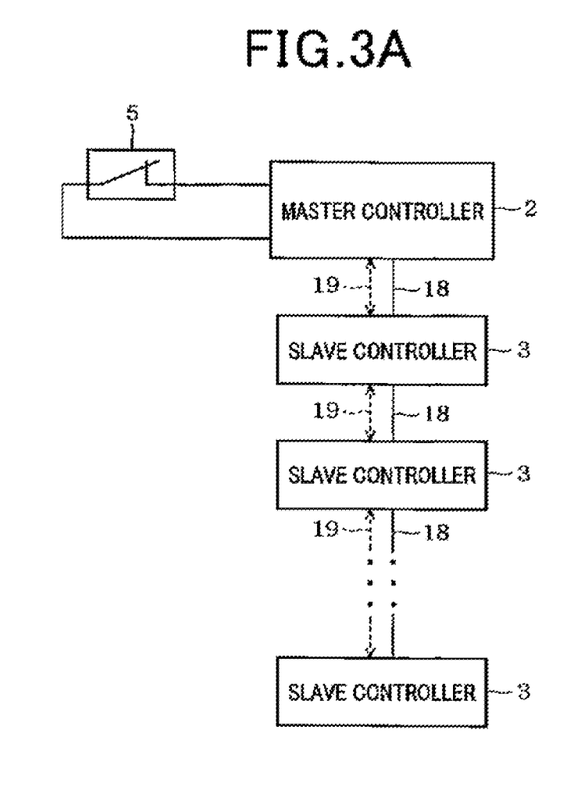
FIGS. 3A and 3B are diagrams schematically showing other wiring examples according to the embodiment.
Figure 3B:
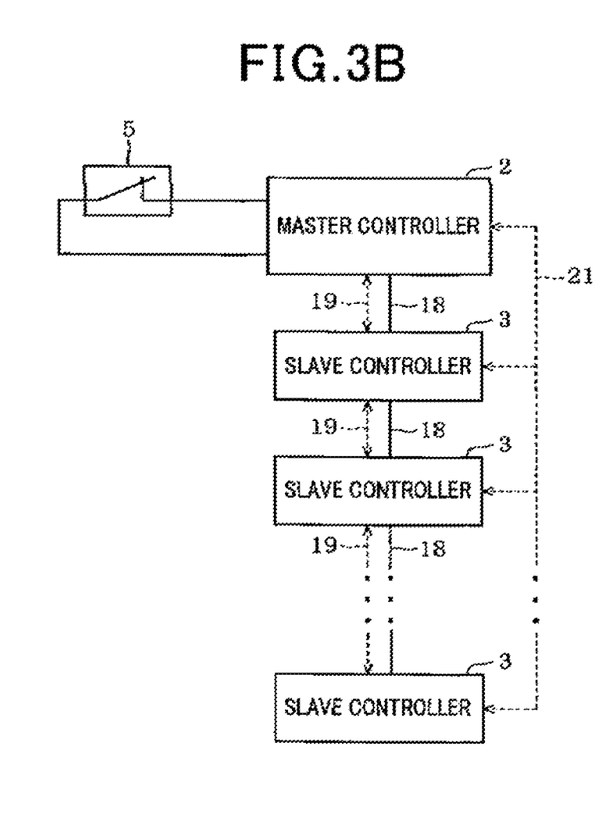

In addition, the path over which the test pulses flow and the path over which the enable signal flows are wired within the slave controller 3 such as to be capable of being outputted outside of the slave controller 3. As shown in FIG. 3, described hereafter, when a plurality of slave controllers 3 are provided, the slave controllers 3 are connected to each other by the connection cable 18.

Next, the workings of the configuration described above will be described.

Here, when a plurality of robots 4 are operated in an interlinked manner, each robot 4 is controlled by a controller. Therefore, a system that is composed of a plurality of robots 4 is also provided with a plurality of controllers. At this time, when a controller is provided with a plurality of systems of a means for performing an emergency stop operation by monitoring test pulses and also guarantees the certainty of the test pulses, the above-described master controller 2 is used as this controller.

Figure 2:
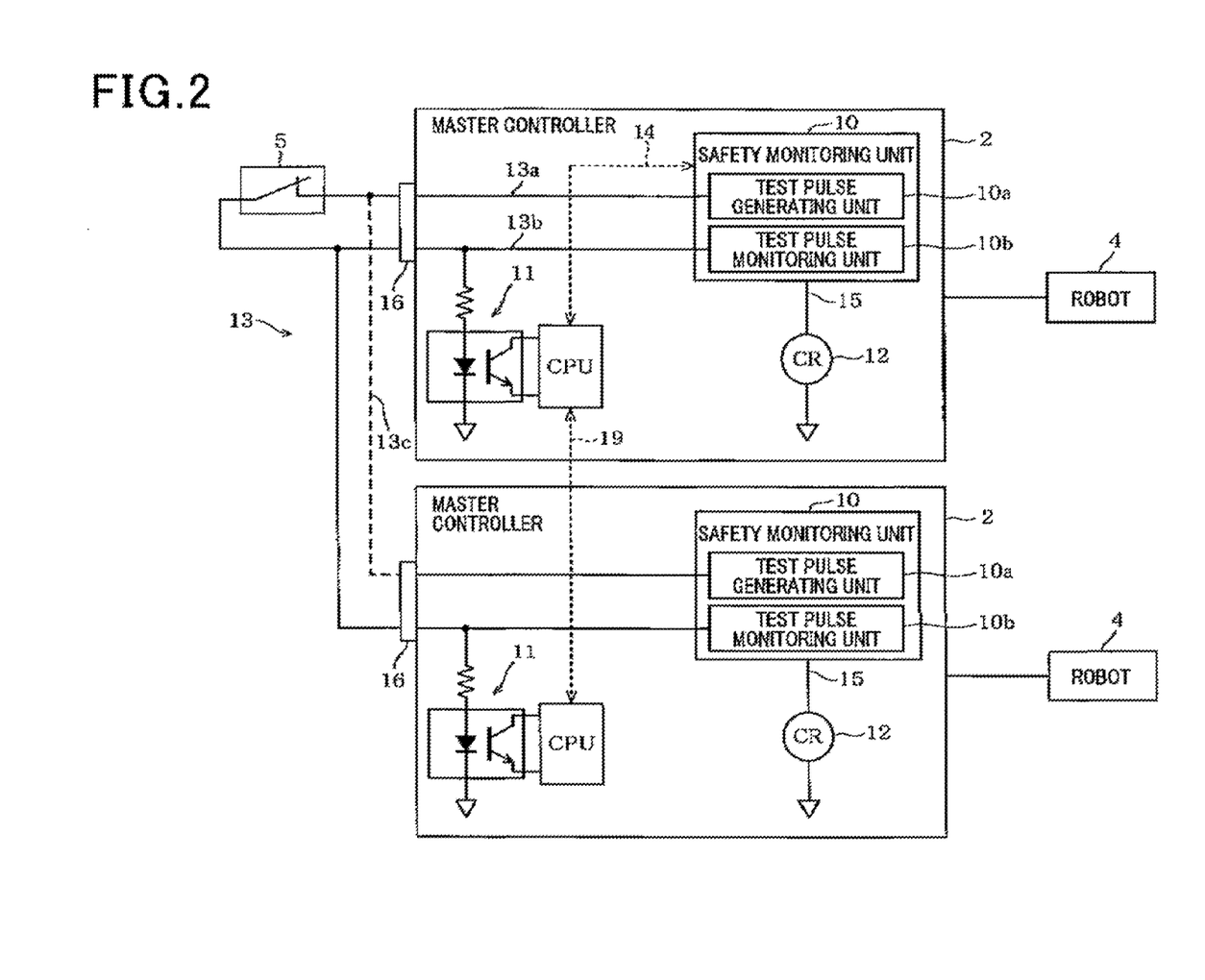
FIG. 2 is a diagram of a comparison example of wiring in which a safety monitoring function is not performed.

When emergency stop of the overall system is performed by the single operating switch 5, in simple terms, the wiring is as shown in FIG. 2. That is, the configuration is such that a plurality of master controllers 2 are connected to the operating switch 5 by the shared connection cable 13.

However, when wiring such as this is used, the test pulses outputted from one master controller 2 (such as the master controller 2 shown in the upper portion in FIG. 2) collide with the safety input signal outputted from another master controller 2 (such as the master controller 2 shown in the lower portion in FIG. 2) and become distorted. Correct monitoring of the safety input signal, that is, a correct emergency stop operation can no longer be performed.

However, should a shared wiring portion 13c of the connection cable 13, indicated by the broken line in FIG. 2, be eliminated to prevent collision of the test pulses, the other master controller 2 determines that an abnormality (that is, a state in which emergency stop should be performed) has occurred because the inputted test pulses do not match the test pulses outputted by the other master controller 2 itself. That said, should the function for confirming the certainty of the test pulses in the other master controller 2 be eliminated, the reliability of the emergency stop operation decreases.

Therefore, according to the present embodiment, as described above, the third path 15 is shared between the master controller 2 and the slave controller 3. The third path 15 is the path over which the enable signal outputted from the safety monitoring unit 10 flows, within the master controller 2.

As a result, in the master controller 2, the contact for power 12 operates in a state in which the certainty of the test pulses has been guaranteed by the safety monitoring unit 10. In the slave controller 3, the contact for power 12 is operated in a state in which the certainty of the test pulses has been guaranteed by the safety monitoring unit 10 of the master controller 2.

In other words, both the master controller 2 and the slave controller 3 are able to be provided with the plurality of systems of the means for performing an emergency stop operation by monitoring test pulses. In addition, in both the master controller 2 and the slave controller 3, the contact for power 12 can be operated (that is, the emergency stop operation can be performed) in a state in which the certainty of the test pulses are guaranteed.

According to the above-described embodiment, the following effects are achieved.

The cables required for connection between the robot controllers are the connection cable 13 (first connection cable) and the connection cable 18 (second connection cable). The connection cable 13 connects the controllers to the operating switch 5. The connection cable 18 connects between controllers. Therefore, wiring can be facilitated.

In addition, because the test pulses (safety input signal) are inputted to all controllers, in all controllers, the control unit 11 (first safety monitoring unit) can perform the emergency stop operation while monitoring the test pulses.

In addition, each controller can be made to perform the emergency stop operation by the single operating switch 5. Therefore, all robots 4 configuring the robot system 1 can be simultaneously stopped. For example, the position of a workpiece that is being gripped by two robots 4 becoming upset, a robot 4 coming into contact with a worker who approaches the robot 4 under an assumption that the robot 4 has stopped, or a robot 4 coming into contact with another robot 4 that has already stopped, peripheral equipment, and the like can be prevented.

Through use of a wiring method such as this, even when each controller is provided with a plurality of systems of a means (control unit 11 and contact for power 12) for performing an emergency stop operation by monitoring test pulses (safety input signal), each controller can be made to perform the emergency stop operation through operation of the single operating switch 5, with simple wiring and in a state in which the certainty of the safety input signal is guaranteed.

In addition, according to the present embodiment, the safety monitoring unit 10 and the control unit 11 within the master controller 2, as well as the control unit 11 of the master controller 2 and the control unit 11 of the slave controller 3, are connected to enable mutual monitoring of operating states. Therefore, even should a malfunction occur in any of the units, the emergency stop operation can be performed by another safety monitoring unit 10 or control unit 11.

Specifically, in a case in which the safety monitoring unit 10 of the master controller 2 has malfunctioned, the control unit 11 of the master controller 2 detects the malfunction and performs the emergency stop operation. Meanwhile, in a case in which the control unit 11 of the master controller 2 has malfunctioned, the safety monitoring unit 10 of the master controller 2 detects the malfunction and performs the emergency stop operation. Furthermore, in a case in which the control unit 11 of the slave controller 3 has malfunctioned, the control unit 11 of the master controller 2 detects the malfunction and stops the output of the enable signal by making the safety monitoring unit 10 perform the emergency stop operation. As a result, the contact for power 12 of the slave controller 3 enters a non-conductive state and the emergency stop operation is performed.

In this case, because it is assumed that the communication path 19 itself is already wired in the robot system 1 including the plurality of robots 4, communication between the master controller 2 and the slave controller 3 can be performed without addition of a new cable.

In addition, according to the present embodiment, the controllers are arranged such as to be adjacent to each other. The path (input path) over which the test pulses flow and the path (output path) over which the enable signal flows are connected between the adjacently arranged controllers by the connection cable 18 by transition wiring. As a result, the input path of the test pulses and the output path of the enable signal can be shared, that is, each controller can be made to perform an emergency stop operation based on common test pulses, with simple wiring. Therefore, compared to when each controller is made to perform an emergency stop operation using separate test pulses, reliability can be enhanced.

The present invention is not limited to the configuration given as an example according to the above-described embodiment. The configuration can be arbitrarily deformed, combined, and expanded without departing from the spirit of the present invention.

When the safety monitoring unit 10 is designed to have high reliability, monitoring of the safety monitoring unit 10 by the control unit 11 may be omitted.

The control unit 11 may acquire the state of the test pulses (safety input signal) from the safety monitoring unit 10 via the communication path 14, rather than from the output of the relay 11b.

When guarantee of the certainty of the safety input signal is performed by a method other than that involving the test pulses, the test pulses may not be used in the manner according to the above-described embodiment. For example, the communication path may be configured based on serial communication that guarantees the certainty of the safety input signal. In this case as well, as a result of the effect of simplified wiring, a reduced risk of erroneous wiring and the like can be expected.

The method for performing an emergency stop may not be the method in which the contact for power 12 is placed in the non-conductive state. For example, regarding an emergency stop by the control unit 11, a reduction in the emergency stop period can be expected by a deceleration torque being generated by power. In addition, the contact for power 12 may be placed in the non-conductive state through a control unit of some sort, without the contact for power 12 being directly placed in the non-conductive state by the enable signal.

When a plurality of slave controllers 3 are provided, as shown in FIG. 3A, the input path of the test pulses and the output path of the enable signal can be shared by a simple connection. That is, the master controller 2 and an adjacent slave controller 3 are connected. Adjacent slave controllers 3 are subsequently connected to each other in a so-called daisy chain. At this time, as a result of the control units 11 of the slave controllers 3 being connected to each other by the communication path 19, when a failure occurs in any of the functional units, the failure can be detected by another controller. Therefore, safety and reliability can be ensured.

In this case, as shown in FIG. 3B, the control unit 11 of the master controller 2 and the control units 11 of the slave controllers 3 may be communicably connected by a communication path 21. A reason for this is as follows. Data communication for control is performed on the communication path 19. Therefore, when data communication for monitoring operating states is performed on the communication path 19, the frequency band of the communication path 19 may become overburdened.

In this case, the control unit 11 of the master controller 2 monitors the operating state of each slave controller 3. When a failure occurs in the control unit 11 of a slave controller 3, the control unit 11 of the master controller 2 detects the failure. When failure occurs in the control unit 11 of the master controller 2 itself, the safety monitoring unit 10 of the master controller 2 detects the failure. Therefore, decrease in safety and reliability can be prevented. Here, the communication path 19 may be eliminated, and only the communication path 21 may be provided. Data communication for control and data communication for monitoring the operating states may be performed over the communication path 21. Alternatively, date communication for monitoring the operating states may be performed over the communication path 19, and data communication for control may be performed over the communication path 21. In other words, the communication path 21 may be configured as the first communication path and/or the second communication path.

According to the embodiment, the two connectors 16 and 17 are shown in the master controller 2 in FIG. 1, for convenience. However, when a single connector is physically provided and the input path of the safety input signal that has passed through the operating switch 5 is wired to enable output to the external slave controller 3 side, the following configurations are possible. That is, transitional wiring may be performed with the connector 16, the input path of the safety input signal may be outputted from the safety monitoring unit 10, or the input path of the safety input signal may be outputted from the control unit 11. In other words, the wiring that enables the input path of the safety input signal in the master controller 2 to be connected outside of the master controller 2 includes internal wiring within the master controller 2, external wiring using the connector 16, wiring that enables the input path of the safety input signal to be outputted from the safety monitoring unit 10, and wiring that enables the input path of the safety input signal to be outputted from the control unit 11. In addition, the output path of the enable signal outputted from the safety monitoring unit 10 (second safety monitoring unit) may be connected to the connector 16 side, and a single connector may be physically provided.

In addition, the foregoing similarly applies to the slave controller 3. A configuration for wiring the input path of the safety input signal that has passed through the operating switch 5 within the slave controller 3 and the output path of the enable signal outputted from the safety monitoring unit 10 (second safety monitoring unit) of the main controller 2 to enable output to an adjacent slave controller 3 side includes internal wiring within the slave controller 3, as according to the embodiment, and external wiring through use of the connector 20.

Separate signal lines for the safety input signal that has passed through the operating switch 5 and the enable signal outputted from the safety monitoring unit 10 are not necessary. A configuration in which serial communication is performed by a common signal line is also possible.

EXPLANATION OF REFERENCE NUMBERS

In the drawings,
1: robot system
2: master controller (robot controller)
3: slave controller (robot controller)
4: robot
5: operating switch
10: safety monitoring unit (second safety monitoring unit)
11: control unit (first safety monitoring unit)
12: contact for power (emergency stopping means)
13: connection cable (first connection cable)
13*a*: first path (input path for safety input signal)
14: communication path (first communication path)
15: third path (output path for enable signal)
18: connection cable (second connection cable)
19: communication path (second communication path)
21: communication path (first communication path and/or second communication path)

What is claimed is:

1. A robot system comprising:
a plurality of robot controllers assigned, respectively, to a plurality of industrial robots,
  the robot controllers including a master controller assigned to one of the industrial robots, and one or more slave controllers assigned to a remaining one or more of the industrial robots,
  the master controller including a first safety monitoring unit, a second safety monitoring unit, and a contactor relay configured to stop operations of the one of the industrial robots to which the master controller is assigned, and
  each of the one or more slave controllers including a first safety monitoring unit and a contactor relay configured to stop operations of the one or more industrial robots to which a corresponding one of the slave controllers is assigned;
an operating switch configured to be manually operated to perform an emergency stop operation of the industrial robots, the operating switch being arranged outside each one of the plurality of robot controllers and connected to the second safety monitoring unit of the master controller via a first connection cable, such that an emergency manual operation at the operating switch transmits a safety input signal between the operating switch and the second safety monitoring of the master controller; and
a second connection cable, wherein:
  the first safety monitoring units are configured to perform an emergency stop operation based on whether the safety input signal transmitted through the operating switch is inputted,
  the second safety monitoring unit of the master controller is configured to perform the emergency stop operation and output an enable signal based on whether the safety signal transmitted through the operating switch is inputted,
  the master controller includes a wiring path wiring an input path of the safety input signal transmitted through the operating switch and an output path of the enable signal outputted from the second safety monitoring unit, such that the input path and the output path are connected serially to the one or more slave controllers via the second connection cable outside the master controller; and
  each of the slave controllers includes a connection path connecting, via the second connection cable, the first safety monitoring unit of the respective slave controller to the input path of the safety input signal and connecting the contactor relay to the output path of the enable signal.

2. The robot system of claim 1, wherein the second safety monitoring unit generates and outputs the safety input signal and performs the emergency stop operation based on: (i) whether the outputted safety input signal is inputted by way of the operating switch, and (ii) whether the inputted safety input signal matches the outputted safety input signal.

3. The robot system of claim 2, wherein the contactor relay is a contact for power that blocks and connects a power path.

4. The robot system of claim 3, wherein,
in the slave controller, the input path of the safety input signal transmitted through the operating switch and the output path of the enable signal outputted from the second safety monitoring unit of the master controller are wired to enable an output to a slave controller side; and
upon a plurality of slave controllers being present, the slave controllers are arranged adjacent to each other and are connected by the second connection cable.

5. The robot system of claim 4, wherein, in the master controller, the first safety monitoring unit and the second safety monitoring unit are connected by a first communication path to monitor an operating state of the first safety monitoring unit by the second safety monitoring unit or to have the first safety monitoring unit and the second safety monitoring unit mutually monitoring each other's operating states.

6. The robot system of claim 5, wherein, between the master controller and the slave controller, the first safety monitoring unit of the master controller and the first safety monitoring unit of the slave controller are connected by a second communication path to monitor an operating state of the first safety monitoring unit within the slave controller by the first safety monitoring unit within the master controller, or to have the first safety monitoring unit and the second safety monitoring unit mutually monitoring each other's operating states.

7. The robot system of claim 1, wherein the contactor relay is a contact for power that blocks and connects a power path.

8. The robot system of claim 7, wherein,
in the slave controller, the input path of the safety input signal transmitted through the operating switch and the output path of the enable signal outputted from the second safety monitoring unit of the master controller are wired to enable output to another slave controller side; and
when a plurality of slave controllers are present, the slave controllers are arranged adjacent to each other and the slave controllers are connected by the second connection cable.

9. The robot system of claim 8, wherein, in the master controller, the first safety monitoring unit and the second safety monitoring unit are connected by a first communication path to monitor the operating state of the first safety monitoring unit by the second safety monitoring unit or to have the first safety monitoring unit and the second safety monitoring unit mutually monitoring each other's operating states.

10. The robot system of claim 9, wherein, between the master controller and the slave controller, the respective first safety monitoring units are connected by a second communication path to monitor the operating state of the first safety monitoring unit within the slave controller by the first safety monitoring unit within the master controller, or to have the first safety monitoring unit within the slave controller and the first safety monitoring unit within the master controller mutually monitoring each other's operating states.

11. The robot system of claim 1, wherein,
in the slave controller, the input path of the safety input signal transmitted through the operating switch and the output path of the enable signal outputted from the second safety monitoring unit of the master controller are wired to enable output to another slave controller side; and
when a plurality of slave controllers are present, the slave controllers are arranged adjacent to each other and the slave controllers are connected by the second connection cable.

12. The robot system of claim 11, wherein, in the master controller, the first safety monitoring unit and the second safety monitoring unit are connected by a first communication path to monitor the operating state of the first safety monitoring unit by the second safety monitoring unit or to have the first safety monitoring unit and the second safety monitoring unit mutually monitoring each other's operating states.

13. The robot system of claim 12, wherein, between the master controller and the slave controller, the respective first safety monitoring units are connected by a second communication path to monitor the operating state of the first safety monitoring unit within the slave controller by the first safety monitoring unit within the master controller, or to have the first safety monitoring unit within the slave controller and the first safety monitoring unit within the master controller mutually monitoring each other's operating states.

14. The robot system of claim 1, wherein, in the master controller, the first safety monitoring unit and the second safety monitoring unit are connected by a first communication path to monitor the operating state of the first safety monitoring unit by the second safety monitoring unit or to have the first safety monitoring unit and the second safety monitoring unit mutually monitoring each other's operating states.

15. The robot system of claim 14, wherein, between the master controller and the slave controller, the respective first safety monitoring units are connected by a second communication path to monitor the operating state of the first safety monitoring unit within the slave controller by the first safety monitoring unit within the master controller, or to have the first safety monitoring unit within the slave controller and the first safety monitoring unit within the master controller mutually monitoring each other's operating states.

16. The robot system of claim 1, wherein, between the master controller and the slave controller, the respective first safety monitoring units are connected by a second communication path to monitor the operating state of the first safety monitoring unit within the slave controller by the first safety monitoring unit within the master controller, or to have the first safety monitoring unit within the slave controller and first safety monitoring unit within the master controller mutually monitoring each other's operating states.

* * * * *